United States Patent [19]

Janke

[11] Patent Number: 4,625,594
[45] Date of Patent: Dec. 2, 1986

[54] PROCESS AND APPARATUS FOR PRODUCING A SAW BLADE

[75] Inventor: Kurt Janke, Solingen, Fed. Rep. of Germany

[73] Assignee: Gebruder Honsberg GmbH Sonderwerkzeugmaschinen und Sagenfabrik, Remscheid-Hasten, Fed. Rep. of Germany

[21] Appl. No.: 773,441

[22] Filed: Sep. 5, 1985

[30] Foreign Application Priority Data

Sep. 11, 1984 [DE] Fed. Rep. of Germany ....... 3433279

[51] Int. Cl.⁴ .............................................. B23D 65/00
[52] U.S. Cl. .......................................... 76/112; 76/37
[58] Field of Search ................... 76/112, 25 R, 37, 41, 76/75, 76, 77

[56] References Cited

U.S. PATENT DOCUMENTS

| 15,879 | 7/1859 | Tanaka | 76/37 |
| 2,856,798 | 10/1958 | Watson | 76/112 |
| 4,335,630 | 6/1982 | Gunzner | 76/25 R |
| 4,450,608 | 5/1984 | Balazs | 76/112 |

FOREIGN PATENT DOCUMENTS

| 235076 | 3/1945 | Switzerland | 76/112 |
| 269567 | 10/1950 | Switzerland . | |

Primary Examiner—Roscoe V. Parker
Attorney, Agent, or Firm—Spensley Horn Jubas & Lubitz

[57] ABSTRACT

In view of the production of saw blades, a continuous sheet metal strip first runs through a hardening surface. Subsequently, the teeth are ground by a grinder. Thereafter, the sheet metal strip is passed through a grinder comprising two parallel grinding wheels to process by the grinding wheel end sides the sides of the sheet metal strip. The outer ends of the laterally projecting teeth are worked by another grinder. After such a treatment of the sheet metal strips, saw blades are formed by cutting off individual length sections.

7 Claims, 4 Drawing Figures

PROCESS AND APPARATUS FOR PRODUCING A SAW BLADE

BACKGROUND OF THE INVENTION

The invention relates to a process for producing a saw blade wherein teeth are formed on one longitudinal edge of a sheet metal strip, and the sheet metal strip is subsequently passed intermediate two grinding wheels which grind down more material from the untoothed area than from the toothed area.

Swiss Pat. No. 269 567 discloses a process for producing a saw blade in which a specific length of a sheet metal strip is passed through a wedge-shaped roller gap formed between the peripheral walls of two grinding rollers. The axles of the grinding rollers form an acute angle thus imparting to the material strip a wedge-shaped configuration. Subsequently, by another grinder, the teeth are ground into the thicker longitudinal edge of the wedge-shaped sheet metal strip. In the mentioned process, the mutual distance of the axles of the two grinding rollers may be changed but only with difficulty. However, the axle distance need be changed to compensate for the wear of the grinding rollers.

According to another process for producing saw blades disclosed in Swiss Pat. No. 235 076, two rotating grinding wheels are used whose axles are inclined relative to the normal line of the sheet metal strip so that the edges of the two grinding wheels only attack at the sheet metal strip sides the point where said edges are spaced the least. It is disadvantageous in said process that only the edges of the grinding wheels are used up and that only a relatively reduced surface area of each grinding wheel is adapted to attack the sheet metal strip.

In all of the cases, prefabricated lengths of the sheet metal strips are processed individually.

SUMMARY OF THE INVENTION

It is the object of the invention to provide a process by which it is possible to economically manufacture saw blades of a good quality.

It is another object of the invention to provide a process in which the grinding wheels are well utilized and used up as uniformly as possible. Further, in case of wear, the gap between the grinding wheels shall be easily readjustable.

According to the process of the invention, it is provided that the mutually parallel end faces of the grinding wheels attack both sides of the sheet metal strip and that the edge of each grinding wheel comprises a conical region for treating the lateral flanks of the teeth. The grinding wheels are grinding down more material from the untoothed area of the sheet metal strip than from the toothed area. As a result, a wedge shape ground out of solid material is imparted to the toothed area.

Conveniently, prior to the production of the teeth, the sheet metal strip is passed through a hardening furnace. The decarbonized surface layer formed during hardening is removed with the grinding of the teeth having a higher hardness accordingly. Moreover, the ground tooth shape ensures that the saw chips better roll off with a resultant higher cutting capacity of the saw blade.

According to another aspect of the invention which is of an independent importance, saw blades are produced in that a continuous strip is passed through a number of processing stations to be subsequently cut to the desired lengths. In such a case, the saw blades are produced along a processing line which is passed by the continuous sheet metal strip. The individual processing stations may be program controlled to optionally produce a variety of tooth shapes, side profiles of the saw blade and chamfers. It is possible this way, to manufacture in one sole manufacturing line different types of saw blades. As another advantage, it is not necessary to introduce successively individual saw blades into a machine and to fix them for their processing.

The saw blade of the invention may be used either in a handsaw or in a power saw. Its ends may be interconnected so that the saw blade is also suitable for a belt saw. Unlike circular saws having a saw body of a rigid plate, the saw blade is a flexible toothed strip, for which the raw material may be delivered in the form of coils. The material is unwound from the storage coil to be fed to the hardening furnace. After the hardening operation, the further processing is performed exclusively with the stretched strip because due to the hardened material, a short-radius winding is not practicable.

BRIEF DESCRIPTION OF THE DRAWING

A preferred embodiment of the invention will be explained hereunder with respect to the accompanying drawings.

DETAILED DESCRIPTION OF THE INVENTION

Figure 1:
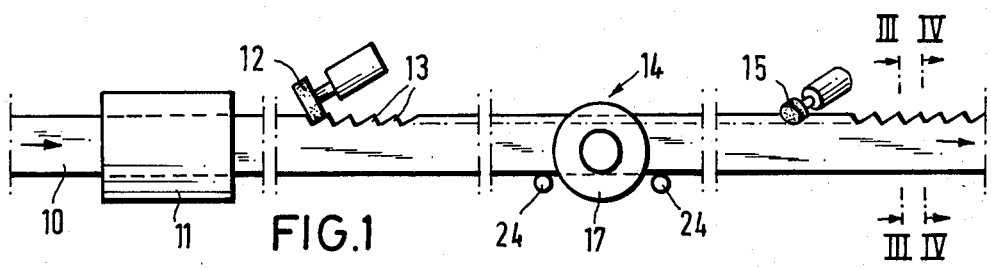
FIG. 1 is a schematic view of the process for producing saw blades.

As obvious from FIG. 1, a strip 10 of sheet steel is passed through a hardening furnace 11 to be subsequently air-hardened by cooling, the strip 10 being of a narrow rectangular shape.

Figure 2:
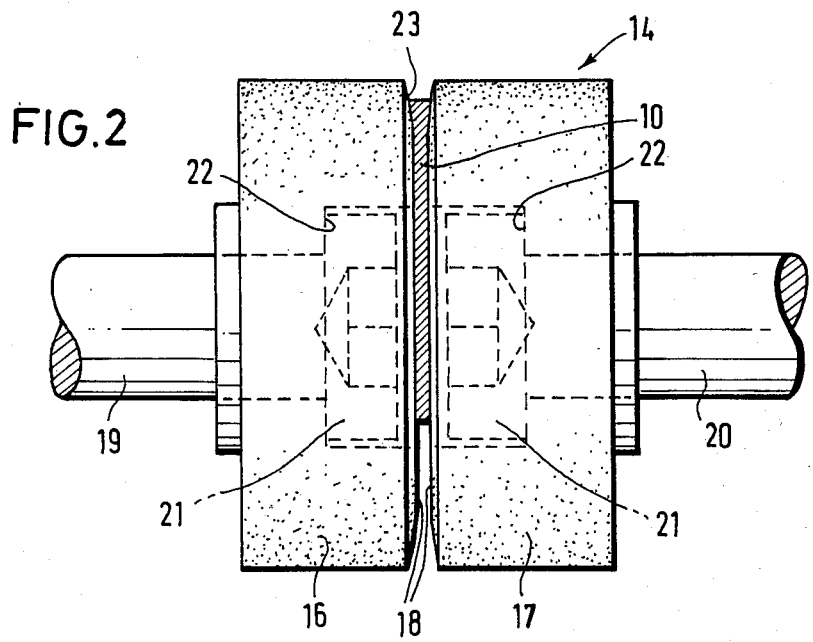
FIG. 2 is a schematic view of the grinding station being passed by the toothed sheet metal strip.

Upon the hardening, a grinder 12 is used to grind the teeth 13 into one longitudinal edge of strip 10. Subsequently, the strip is running through the grinder 14 illustrated in FIG. 2, whereas the sides of the teeth points are chamfered by another grinder 15. After all, a (non-illustrated) severing means cuts the continuous band-shaped strip 10 to the desired lengths which form the saw blades.

Grinder 14 comprises two grinding wheels 16 and 17 arranged at both sides of the strip 10, their grinding end sides 18 being confronted with each other. Each of the grinding wheels 16 and 17 is mounted at the end of a rotating shaft 19 or 20, the fixation being performed by means of a bolt 21 countersunk in a recess 22 in the center of the end wall 18 of the grinding wheel. The working surface of each grinding wheel 16 and 17 is annular accordingly, and its outer edge 23 is frustoconically shaped.

Figure 3:
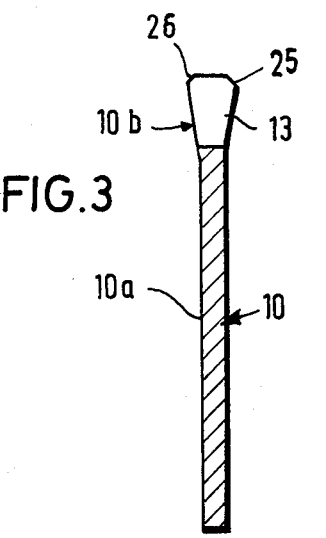
FIG. 3 is a cross section of the strip along line III—III of FIG. 1.
Figure 4:
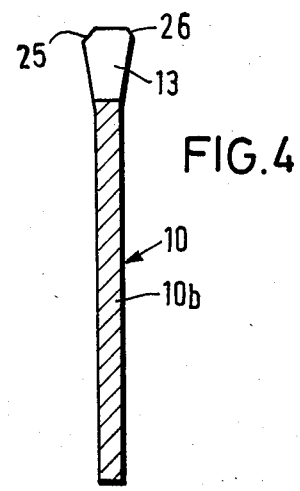
FIG. 4 is a cross section along line IV—IV of FIG. 1.

In advance of the grinder 14 and after it, the strip 10 is supported by rollers 24 (FIG. 1) on which moves the plane lower strip edge. The support rollers 24 are as high as to permit to treat by the frustoconical regions 23 of the grinding wheels 16 and 17 the teeth provided along the upper edge of the strip, at both sides, while the untoothed region of the strip is being worked by the parallel end faces 18 of the grinding wheels. The resultant cross sectional shape of the saw blade is generally illustrated in FIGS. 3 and 4. Due to the ground down lateral faces, the untoothed area 10a is less thick than the toothed area 10b, and the material thickness in the toothed area 10b continuously increases towards the upper edge, while both lateral flanks which have been worked by the conical regions 23 of the grinding wheels extend in a continuous inclination to the outside. As evident from FIG. 2, the width (height) of strip 10 is inferior to the diameter of the grinding wheels 16, 17 so that the untoothed region 10a is exposed as far as to the lower edge, to the working operation by the parallel working faces of the grinding wheels, and only the upper toothed area is bevel-ground.

After the grinding down of the lateral faces of the strip, the chamfers 25 and 26 at each tooth 13 are produced by grinder 15. Each chamfer 25 and 26 extends at an angle of about 45° relative to the strip plane, however, one side of chamfer 25 is larger than the other side of chamfer 26. In case of two adjacent teeth, the larger chamfer 25 is provided at opposite sides, as obvious from FIGS. 3 and 4. This contributes to a better displacement of the cutting chips during sawing, and at that same time, the directional accuracy as well as the cutting efficiency are improved.

The process of the invention is particularly suited for the mass production or the large-scale manufacture of saw blades. The strip 10 need not necessarily consist of a homogenous material, but it may be produced of a bimetal in which the toothed area 10b is made of a material different from that of the untoothed area 10a.

What is claimed is:

1. Process for producing a saw blade, comprising the steps of:
   providing a metal strip;
   forming teeth on one longitudinal edge of the metal strip;
   passing the metal strip between two grinding wheels for grinding down more material from the untoothed area of the metal strip than from the toothed area, wherein each wheel includes opposing mutually parallel end faces for grinding both sides of the sheet metal strip and each grinding wheel further includes a conical edge region for grinding the lateral flanks of the teeth.

2. Process according to claim 1, further comprising the step of passing the metal strip through a hardening furnace prior to the teeth forming step.

3. Process according to claim 1, further comprising the step of passing the metal strip between a second pair of grinding wheels, each wheel mounted with an axis at about 45° relative to the first pair of grinding wheels to produce a chamfer to at least one side of the teeth.

4. Process according to claim 3, wherein the chamfer is provided at opposite sides of two adjacent teeth.

5. Process according to claim 4, wherein chamfers of different size are produced at both sides of the teeth and the larger dhamfer is provided at opposite sides of the two adjacent teeth.

6. Process according to claim 1, wherein the passing step further comprises passing the metal strip through a number of processing stations and thereafter cutting the strip into desired lengths.

7. An apparatus for grinding a saw blade having lateral side faces, each face having a toothed portion and an untoothed portion, comprising:
   a first pair of grinding wheels having mutually parallel end face portions for grinding the opposing lateral faces of the untoothed portion of the saw blade as it moves relative to the grinding wheel; and
   a conical end face portion for grinding lateral faces of the toothed portion of the saw blade as it moves relative to the grinding wheel; and
   a second pair of grinding wheels, each wheel mounted with its axes at about 45° relative to the first pair of grinding wheels for providing a chamfer to the lateral faces of the toothed portion.

* * * * *